July 1, 1924.
W. G. BOONZAIER
1,499,966
AUTOMATIC COUPLING FOR RAILWAY AND LIKE VEHICLES
Filed Oct. 22, 1919     4 Sheets-Sheet 1
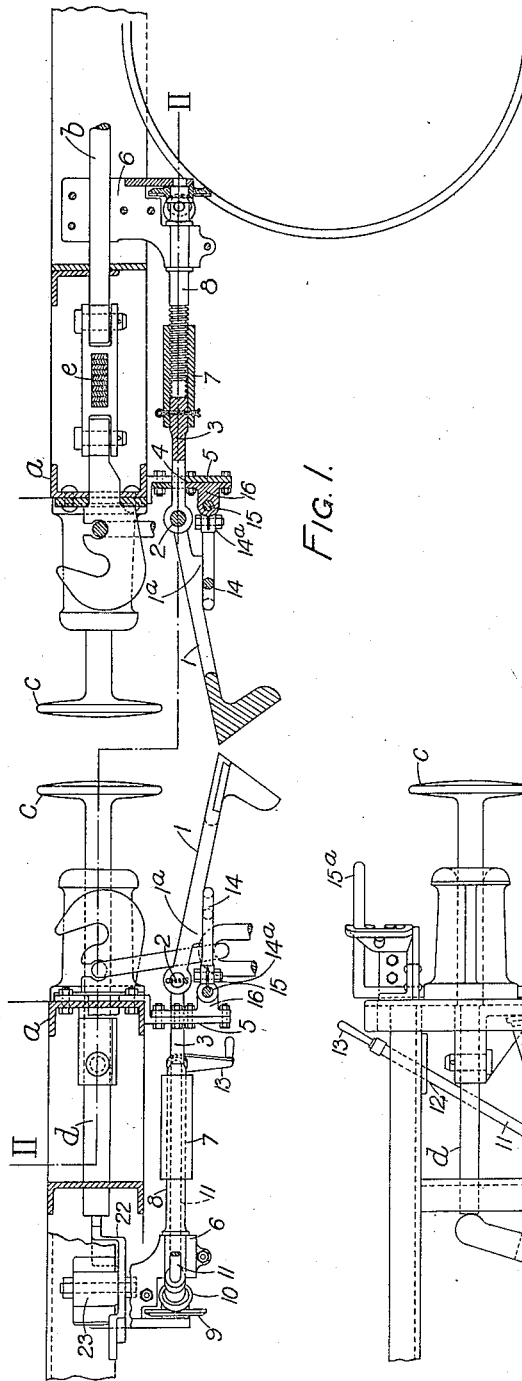
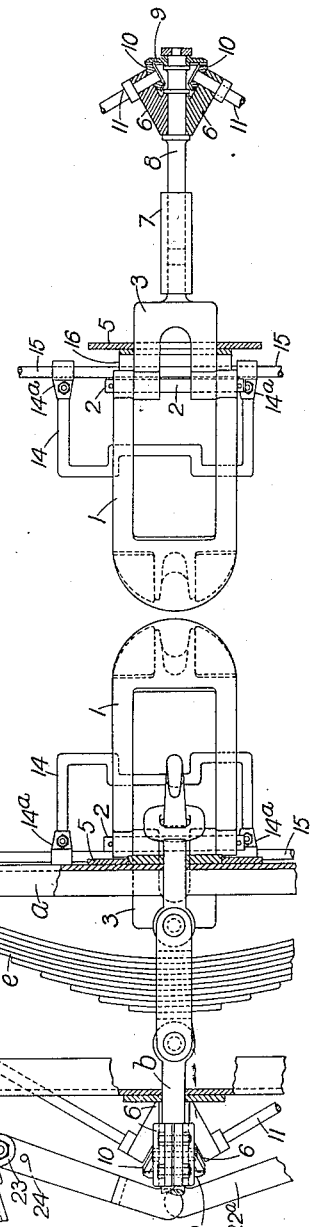

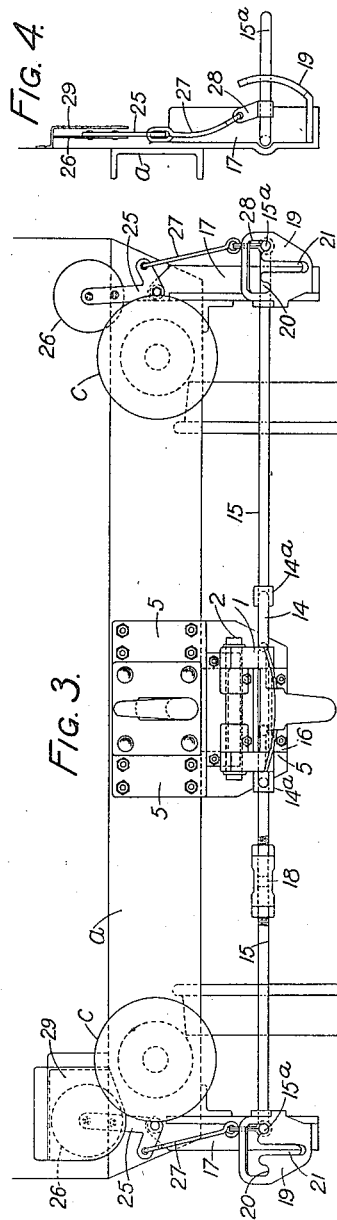

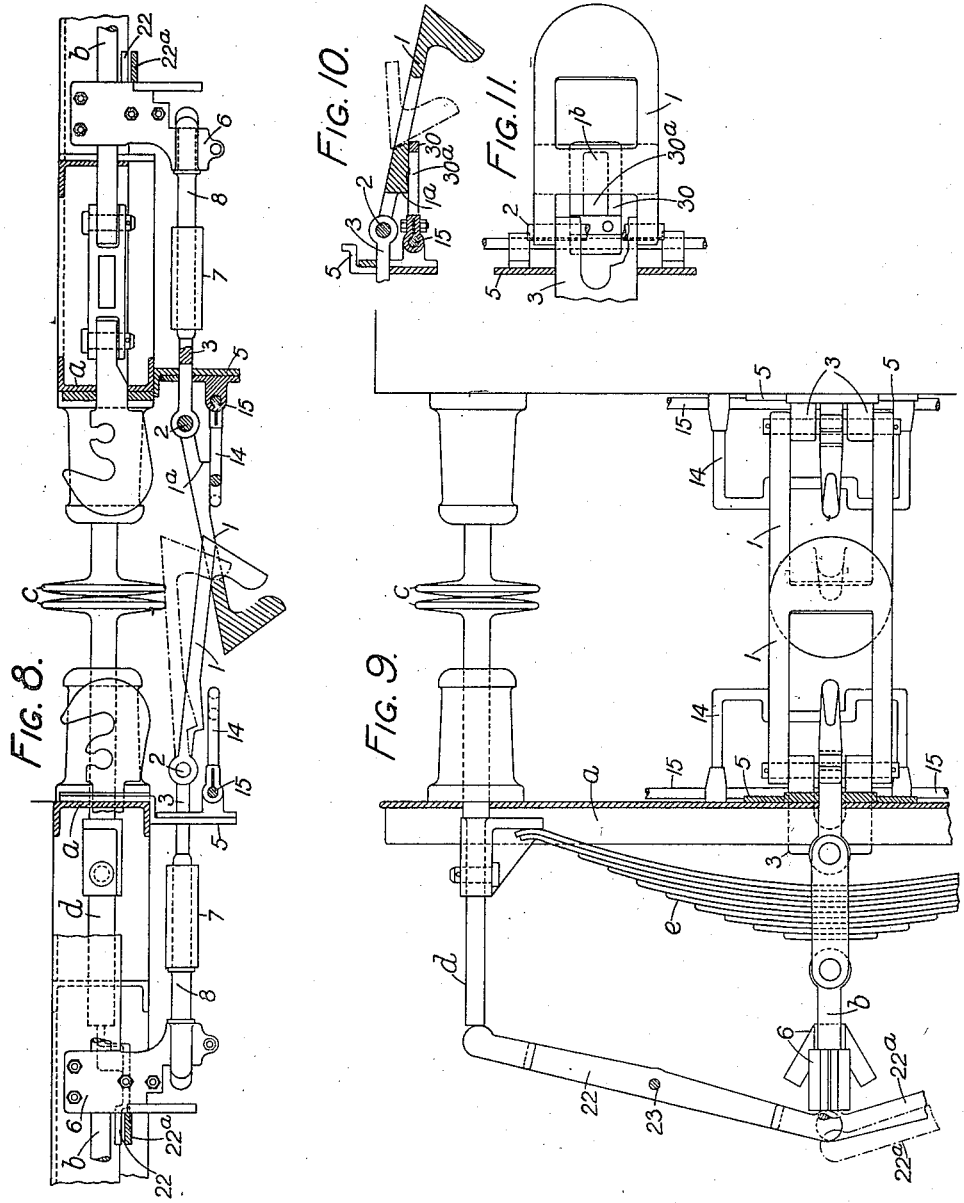

July 1, 1924.
W. G. BOONZAIER
AUTOMATIC COUPLING FOR RAILWAY AND LIKE VEHICLES
Filed Oct. 22, 1919
1,499,966
4 Sheets-Sheet 4
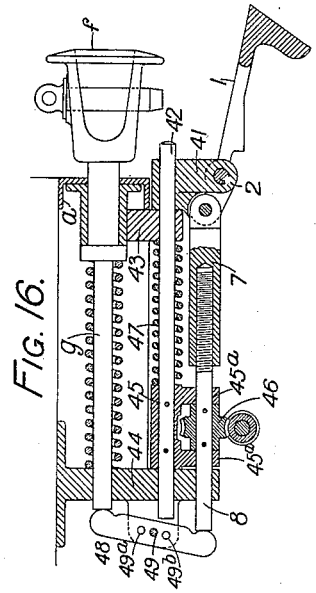
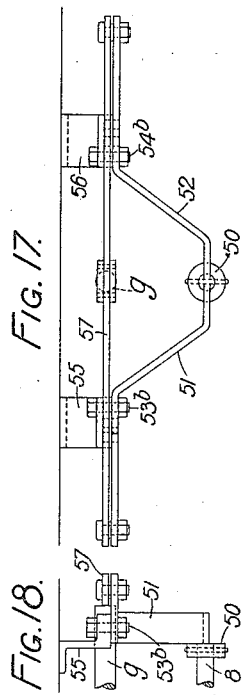
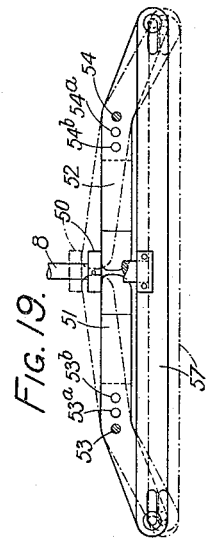
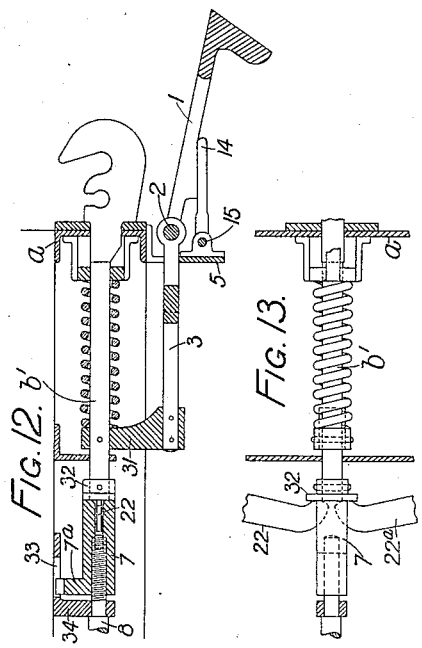
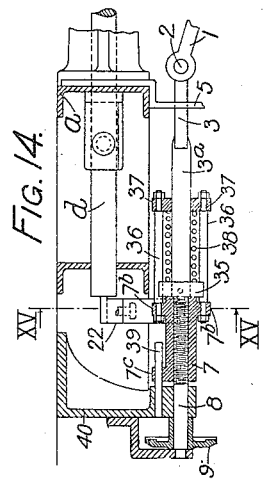
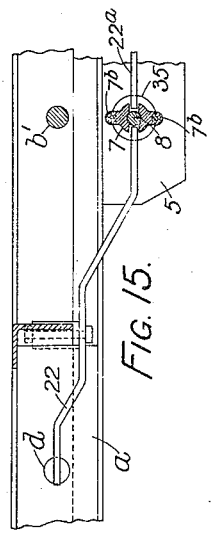
Inventor
Wilhelm Goert Boonzaier
by Spear, Middleton, Donaldson & Hass
Attys.

Patented July 1, 1924.

1,499,966

UNITED STATES PATENT OFFICE.

WILHELM GOERT BOONZAIER, OF NEW WANDSWORTH, LONDON, ENGLAND; IRÈNE KATHLEEN HOLLAND AND GREGORIO JOHN BOONZAIER EXECUTORS OF SAID WILHELM GOERT BOONZAIER, DECEASED.

AUTOMATIC COUPLING FOR RAILWAY AND LIKE VEHICLES.

Application filed October 22, 1919. Serial No. 332,505.

*To all whom it may concern:*

Be it known that I, WILHELM GOERT BOONZAIER, a subject of the King of Great Britain, residing at New Wandsworth, London, England, have invented certain new and useful Improvements in or Relating to Automatic Couplings for Railway and like Vehicles, of which the following is a specification.

This invention relates to improvements in automatic couplings for railway and like vehicles wherein hook-links are arranged on the vehicles to be coupled in such a way that on the vehicles being shunted together one hook will ride up over and engage with the corresponding hook-link of the opposed vehicle, and has for its object to simplify the construction, and improve the efficiency of such devices.

The invention relates more particularly to means for controlling the position of the hook-link members of the coupling devices, and to associated means for visually indicating whether the coupling is in operative or inoperative position: and also to improved means for effecting tight coupling by the employment of pivoted levers acting on the draw-bar of the coupling.

The invention further includes means for facilitating the uncoupling of tight coupled vehicles, whereby compression of the buffers to release the draw-bar hook is avoided, the means employed including gearing mechanism whereby the coupling hooks or links can be advanced to allow of disengagement.

Another feature of the invention consists in an improved construction of horizontally hinged hook-link or its support whereby the height of its forward or engaging ends from the rails will remain constant, when being advanced or retracted, whatever may be the longitudinal movement of the horizontal member to which it is attached.

Other features of the invention will be referred to in the following description, and included in the appended claims.

In the accompanying drawings several forms of construction, embodying the invention are illustrated.

Figure 1 shows partly in elevation, and partly in section the ends of two railway vehicles, having continuous draw-bars opposite each other in position ready for coupling.

Figure 2 is a plan view partly in section on the line II—II of Figure 1.

Figure 3 is an end elevation of the vehicle and

Figure 4 a side elevation of the indicator device.

Figures 5, 6 and 7 show respectively in end elevation, side elevation, and longitudinal vertical section on the line VII—VII of Fig. 5, the coupling device in its inoperative position.

Figures 8 and 9 are similar views to Figs. 1 and 2, (only the main parts being shown) but represent the vehicles in their coupled position.

Figures 10 and 11 show in sectional elevation and plan respectively a modification in the arrangement for raising and lowering the coupling link.

Figures 12 and 13 show in vertical longitudinal section and plan respectively an adaptation of the device to vehicles provided with short draw-bars.

Figures 14 and 15 show, in longitudinal vertical and transverse section on the line XV—XV Fig. 14, a modification in the means for regulating tight and loose couplings.

Figure 16 shows in a longitudinal section the coupling device adapted to vehicles with a single central buffer, and Figs. 17, 18 and 19 show, in end elevation, side elevation and plan respectively, a modification of a part of the device shown in Fig. 16.

In Figs. 1 to 9 the invention is illustrated as applied to railway vehicles having what is known as a continuous central draw-bar and side buffers.

The hook-link coupler 1 (which is here shown as substantially of the U shaped form described in the specification of my Patent No. 29,133 of 1912) is hinged by means of a hinge pin 2 to a cross-head 3 which is arranged to slide horizontally in a horizontal slot 4 in a plate 5 provided centrally underneath the usual coupling hook, and a short distance below the end beam *a* of the underframe of the vehicle, this plate 5 being fixed to the said beam *a*. The cross-head 3 is connected to the draw-bar *b* by means of a bracket 6—split or otherwise—in such way that to all intents and purposes it forms an integral part of the said draw-bar. Thus the coupler and draw-bar will move back and forth together. In some cases the hook-link or coupler could be directly hinged to the draw-bar.

In order to regulate the position of the coupler for loose or tight couplings i. e. to cause it to project more or less beyond the end of the vehicle, the inner end of the cross-head 3 carries rigidly connected to it, a threaded sleeve 7 which engages a threaded spindle 8, rotatably but not slidably mounted in the bracket 6, which is rigidly connected to the draw-bar $b$. On the spindle 8 is mounted a crown wheel 9 actuated by either of two bevel wheels 10 (Fig. 2) mounted on shafts 11 journalled in bearings provided laterally in the bracket 6. The shafts 11 extend to the sides of the vehicle where they are supported in a slotted steady-bearing 12, and provided with a crank or other handle 13. By turning either of the handles 13 the spindle 8 is caused to revolve and, by means of its threaded part, causes the sleeve 7 and with it the cross-head 3 and coupler 1 to recede or advance as may be desired. Instead of the gear shown in the drawing (Figs. 1 and 2) a worm wheel may be mounted on the spindle 8 such worm wheel being operated by a worm mounted on a shaft extending from one side of the vehicle to the other and having an operating handle at each end.

Either of such gears might be mounted in a stationary bracket rigidly secured to some part of the underframe and independently of the bracket 6, in which case the crown wheel 9, or the worm wheel as the case may be, would be mounted on a sliding key on the spindle 8.

For tight coupling the couplers 1 are preferably drawn back to their retracted position before coupling, or they might be drawn in and tightened up to a certain degree after coupling: very tight coupling could, however, not be obtained in this last mentioned way because it would involve too great a strain on the adjusting gear. The gear 9 to 13 (or its equivalent worm gear) also serves for uncoupling tightly coupled vehicles, either one or both couplers being by this means moved outwardly until the lower one can clear the hook of the other and drop down into inoperative position.

In order to hold the couplers 1 in the correct position for coupling, a carrier or supporting crank 14 is provided which is adapted to be operated from either side of the vehicle. For this purpose the crank 14 which, roughly speaking, is of U shape, is rigidly secured, directly under the coupler 1 to a rod 15—or it may be an integral part of the rod—extending from side to side of the vehicle, and pivotally as well as slidably mounted in bearings 16 secured to the plate 5, just below the cross-head 3 and in bracket 17, secured to the two ends of the beam $a$ of the underframe. The two ends of the rod 15 are bent at a right angle to form operating handles 15$^a$ at each side of the vehicle. The rod 15 is preferably made in two sections, joined together by means of a coupling nut 18 (Figs. 3 and 5) with right and left handed threads, so as to enable and facilitate accurate adjustment of its length.

Secured to the bracket 17 are gates 19 provided with vertical slots of different lengths, substantially in the form of a T, and extending downwardly from a transverse slot in such a way that notches 20, 21 are formed, in which the handles 15$^a$ which pass through the gates, are adapted to rest and to be supported and locked. The short notches 20 determine the position of the handles when the coupler 1 is raised by the carrier-crank 14 to its operative or coupling position (Figs. 1, 3, 4 and 8) while when the handles are dropped into the deep notches 21 the crank 14 allows the coupler 1 to drop into its in-operative position (Figs. 5 to 7). It will be seen that to transfer a handle 15$^a$ either from a notch 20 into the notch 21, or vice-versa, it requires two distinct movements firstly upwards and then sideways, before it can be dropped into the desired notch, the handle 15$^a$ is therefore securely located and accidental displacement, as by vibration, is prevented.

When the carriages are coupled loose, or to a slightly tight degree only, uncoupling may be effected by simply releasing the lowermost coupler, i. e. by moving the handle 15$^a$ (from either side) of the carrier-crank 14 into the deep slot 21 and simultaneously raising the handle 15$^a$ of the other vehicle out of its notch 20 without, however, sliding it sideways. This has the effect of completely freeing the lower coupler from the hook of the upper coupler. Assuming for the moment the pair of couplers 1 shown in Fig. 8 to represent the case in question, and assuming the crank 14 of the vehicle on the right to be turned down, it will be seen that the coupler 1 on this side is prevented from dropping by the hook of the other coupler, but is freed when the latter coupler is raised by its crank 14 into the position shown in dotted lines: should, however, the coupling be too tight to allow of disengagement in this manner, recourse must be had to the gear operated by the handle 13, as explained hereinbefore with regard to tight coupling.

To ensure that the couplers 1 of all and any vehicle are held at a uniform standard height above the rails, and, particularly, with a view to meet this requirement in old vehicles with worn bearings or sagging springs, the crank 14 is preferably secured to the rod 15 in such a manner that its angular position thereon may readily be adjusted. For this purpose, the crank 14 is clamped to the rod 15 by means of split bearings and bolts 14ᵃ provided at the ends of its shanks, as shown in Figs. 1 and 2.

In order to maintain the couplers 1 when in coupling position at the normal, predetermined inclination, while being moved out or drawn back either by the gear 9, 10 or by action of compression of the buffers c, when the vehicles are shunted together (which action will be described hereinafter) wedge shaped surfaces 1ᵃ are provided on the underside of the arms of the U shaped couplers in such a way that normally, the face of contact of said wedge with the crank 14 is parallel with the direction of movement i. e. parallel with the rails or with the axis of the cross-head 3. The effect is clearly seen by comparison of Figs. 1 and 8. Otherwise as the coupler is moved out to effect a coupling, the free end of the hook would drop correspondingly.

Double levers 22 and 22ᵃ, pivoted at 23 on either side of the underframe of the vehicle, abut at their outer ends each against the inner end of one of the buffer bars d and with the other ends against the back of the bracket 6, so that, when the buffers c are compressed the levers 22, 22ᵃ acting on bracket 6 will force the draw-bar b together with the cross head 3 and coupler 1 out in opposite direction to that of the buffer (see Fig. 9) thus causing the couplers of the two carriages to meet and one of them to ride up and over the top of the other and then to drop and engage with its hook in the eyelet of the other as shown in Figs. 8 and 9.

Figure 9 illustrates coupling on a straight line but will equally explain coupling when the vehicles are on a curve. Assuming, in that eventuality, the buffers c shown in the drawing to be those on the inside of the curve, it is clear that the pair of buffers of the other side, will according to the radius of the curve only slightly compress or not meet at all, and therefore not operate the lever 22ᵃ which will remain in its original position (shown in broken lines in Fig. 9). The lever 22 operated by the inside buffer will, however, alone do the work explained above, efficiently.

The double levers 22 and 22ᵃ may be provided with three or more pivot holes 24 (Figure 1) in order to enable the leverage to be varied.

In the form of construction described above in connection with Figs. 1 to 9 the tension on the coupling links 1 is taken up by springs provided in the ordinary way in rolling stock, viz by a resilient connection interposed in continuous draw-bars (not shown in the drawings) and by the buffer springs e employed in certain types of vehicles.

An improved device for automatically indicating by means of signal discs or the like, the position (operative or inoperative) of the coupler links, is shown in Figs. 3 to 6. Pivoted near each end of and to the beam a of the underframe is a bell-crank lever 25 carrying at its long upwardly extending arm a signal disc 26, its short arm being connected by a link 27 to a strap 28 which is clamped to the handles of the rod 15 carrying the crank 14. When the handle 15ᵃ is up in one of the notches 20 and consequently the coupler 1 in operative position for coupling (Figs. 3 and 4) the signal disc 26 is withdrawn behind a guard or obdurating shield 29 or within the width of the vehicle, so that it is not visible, but when the handle 15ᵃ is moved down into the notch 21, and the coupler is down in its in-operative position (Figs. 5 and 7) the disc 26 is swung out sideways so that it projects beyond the side of the vehicle, thus indicating that the particular coupler is not set for coupling.

In certain cases, particularly in railway coaches, pneumatic or gas pipes or other fittings may interfere with the use of a crank like 14 shown and described with regard to Figs. 1 to 9. In such cases a modified form of crank, as shown in Figs. 10 and 11, may be employed. The crank is made much narrower and may be in the form of a simple plate or lever arm 30 secured to the rod 15 in a similar manner to that employed for crank 14; for the sake of lightness this lever arm has preferably a rectangular opening 30ᵃ. The wedge surfaces 1ᵃ of the coupler arms extend in this case right across, from one arm to the other, in the form of a web 1ᵇ, the front edge of which is bevelled off so as to enable the hook of the oncoming coupler 1 (shown in broken lines Fig. 10) to ride up on top of said wedge in case it should advance too far, whereby damage or breakage is safeguarded against.

Figs. 12 and 13 illustrate an adaptation of the invention to vehicles having a short draw-bar, as distinguished from a continuous draw-bar. The cross-head 3 is here directly and rigidly connected to the draw-bar b¹ by means of a bracket 31. A collar 32 against which the inner ends of both levers 22, 22ᵃ as well as the sleeve operate, is fitted to the inner end of the draw-bar b¹. The sleeve 7 is slotted, into which slot the inner ends of the levers 22 and 22ᵃ project, in order to engage with the draw-bar b¹ as near its axis as possible. In order to prevent the sleeve 7 from revolving it is provided with an arm 7ᵃ engaging in a slot 33 in the bracket 34, which is fixed to the underframe, and provides a bearing for the spindle 8, which is actuated by a gear (not shown in the drawings) such as described hereinbefore for the purpose of longitudinally moving the draw-bar, but which in this case is mounted in a stationary bracket, or the like, secured to the underframe. In this case also the existing draw-bar is utilized to take up the tension on the coupling links.

Figures 14 and 15 show a modification in which the coupling device is arranged independently of the existing draw-bar (either short or continuous). On the free end of the stem 3ª of the cross-head 3 is mounted a collar 35 against which the ends of the levers 22, 22ª and the sleeve 7 operate. The sleeve 7 is provided, at its forward end, with two or more lugs 7ᵇ, in which are mounted parallel to the axis of the sleeve, a similar number of rods 36, which, at their forward ends, are secured to a collar 37, slidably mounted on the stem 3ª. The sleeve 7, rods 36, and collar 37 thus constitute a cradle for a compression spring 38 placed on the stem 3ª between the collars 35 and 37 thus maintaining normally contact between the collar 35 and the sleeve 7. In this case, the spring 38 takes up the strain exercised by draft through the couplers 1. At its rear end the sleeve 7 is provided with a lug 7ᶜ through a bore of which passes a pin 39, which is rigidly secured in a bracket 40, and prevents the sleeve 7 from revolving. The adjusting spindle 8 is journalled in bracket 40 and carries the crown wheel 9 and is operated in a similar manner to that described with reference to Figure 1.

When one or both of the buffers is forced in, its rod d will act on one end of the pivoted arm 22 and cause its other end to force the collar 35 and consequently the coupler 1 forward, against the pressure of the spring 38, which will tend to draw the coupler back.

Figure 16 represents the invention in its adaptation to vehicles with central buffers, the pivoted levers being arranged vertically instead of horizontally. The coupler 1 by means of pin 2 is again hinged to a cross head 41 slidably mounted on an auxiliary shaft 42 which itself is slidable in brackets 43 and 44, secured to the underframe of the vehicle. The sleeve 7 is hinged to the cross-head 41 and the spindle 8 is mounted in a bracket or hanger 44 secured to the vehicle. A bracket 45 rigidly mounted on the auxiliary shaft 42 embraces, by means of its lugs 45ª, a worm wheel 46 which is rigidly secured to the spindle 8. A compression spring 47 between the bearing 43 and bracket 45 on the shaft 42 takes up, through the bracket 45, spindle 8, sleeve 7 and cross-head 41, any tension exercised on the coupler 1. A lever 48 pivoted at 49, 49ª, or 49ᵇ, according to the desired leverage, is actuated by the existing draw-bar g, when the buffer f is pressed inwards against its spring, and operates, in a similar manner to that described in connection with Figures 8 and 9, the spindle 8, and, through it, moves the coupler 1 outwards, thereby compressing the spring 47 between the brackets 45 and 43.

Figures 17, 18 and 19 illustrate a modification of the operating lever 48 shown in Fig. 16, with the object of obtaining a greater and more efficient leverage.

On the free end of the spindle 8 is mounted a collar 50 in order to provide an increased bearing surface for two cranked or bent levers 51 and 52 which are pivoted at 53, 53ª, or 53ᵇ, 54, 54ª, or 54ᵇ according to the extent of leverage desired, to brackets 55 and 56 secured to the under frame. These levers are arranged horizontally similarly to those shown in Figure 2. The inner ends of the levers abut against the collar 50 while their other ends are connected by pin and slot connection to a cross-bar 57 which bears against the inner end of the existing draw-bar g. On the buffer being pressed in when coupling, the draw-bar g will cause the bar 57 to recede and thus, through their pin and slot connections, the levers 51 and 52 will swing about their pivots 53 and 54 in such a way that their ends, abutting against the collar 50 will be thrown forward in a direction opposite to that of the buffer bar (as shown in broken lines in Fig. 19) i. e. they will push the spindle 8, sleeve 7 and bracket 41 together with the coupler 1 forward or outward to cause the two opposed couplers to interengage, whereupon the spring 47 becomes operative in the manner described of a draw-bar spring.

What I claim and desire to secure by Letters Patent is:—

1. An automatic coupling for railway and like vehicles comprising a hook-link coupling member hinged horizontally to a longitudinally movable horizontal member, an inclined surface on the under side of the coupling member, a spring to take up the tensile strain on the coupling, and a transverse crank shaft upon which the inclined surface on the underside of the coupling member is adapted to rest.

2. An automatic coupling for railway and like vehicles comprising a hook-link coupling member hinged horizontally to a longitudinally movable horizontal member, an inclined surface on the underside of the coupling member, a spring to take up the tensile strain on the coupling, a transverse shaft and an angularly adjustable crank member on said shaft adapted to support the underside of the coupling member.

3. A coupling for railway and like vehicles comprising a central hook and draw-bar, a hook-link coupling member hinged horizontally to a longitudinally movable horizontal member mounted below and in addition to the central draw-bar, a spring to take up the tensile strain on the coupling member when in use, and means for supporting the coupling member, whereby when it is moved in a forward or backward direction its forward end is caused to travel always on the same horizontal plane.

In testimony whereof I affix my signature in presence of two witnesses.

WILHELM GOERT BOONZAIER.

Witnesses:
 WILLIAM S. COLLINS,
 LEON BELITHER.